United States Patent Office 3,579,489
Patented May 18, 1971

3,579,489
POLYMERIZATION OF BETA-LACTONES
Willem M. Wagner, Amsterdam, Netherlands, assignor to Shell Oil Company, New York, N.Y.
No Drawing. Filed Dec. 20, 1968, Ser. No. 785,795
Claims priority, application Great Britain, July 1, 1968, 31,239/68
Int. Cl. C08g 17/02
U.S. Cl. 260—78.3    12 Claims

ABSTRACT OF THE DISCLOSURE

The molecular weight distribution and heat stability of polylactones, particularly poly(beta-lactones), are controlled by polymerizing the lactones in the presence of an ionic initiator and certain chain-transfer agents such as alpha-halo-ketones and alpha-halo-aldehydes.

BACKGROUND OF THE INVENTION

This invention relates to a method for polymerizing lactones.

Lactones, and particularly the beta-lactones, are polymerized with the aid of suitable catalysts such as phosphines, arsines or stibines, as described in French Pat. 1,419,642. The resultant polyesters, in general, possess very high molecular weights. The use of other anionic catalysts or initiators, particularly the tertiary amines, is also described in French Pat. 1,231,163.

In general, the polylactones prepared with the aid of anionic initiators, exhibit molecular weights which are too high for many applications, such as, for example, for the manufacture of threads and fibers.

It has now been discovered that the molecular weight and molecular weight distribution as well as improved thermal stability is obtained when the polymerization is performed in the presence of certain compounds, herein referred to as "chain-transfer agents," and hereinafter described in greater detail.

SUMMARY OF THE INVENTION

The present invention is directed to a method for polymerizing lactones, particularly the beta-lactones. The present process permits beta-lactones to be polymerized to polyesters having a molecular weight attuned to the type of processing while favorably influencing the molecular weight distribution. The resulting polyesters also exhibit improved heat stability.

It has now been found that a class of excellent chain-transfer agents comprises those aldehydes and ketones which have a halogen atom in an alpha-position relative to the carbonyl group. Thus, when alpha, alpha-dimethylpropiolactone is allowed to polymerize in the presence of 3-chloro-2-butanone as chain-transfer agent, a much more desirable molecular weight of the resulting polyester can be achieved than in the case of the unsubstituted 2-butanone, as shown by a lower value of the intrinsic viscosity. Moreover, the thermal stability of the product proves to be highly satisfactory. This is very surprising in view of the contrasting behavior of the alpha-halocarboxylic acids and their derivatives, where the halogen atom present in the alpha-position relative to, for example, a carboxyl or halocarbonyl group appears to have an unfavorable effect on the thermal stability of the polyester produced, as exemplified by the use of alpha-chloropropionic acid.

DESCRIPTION OF THE PREFERRED EMBODIMENT

The process of the instant invention is particularly directed to the polymerization or copolymerization of beta-lactones in the presence of anionic initiators wherein said polymerization is conduced in the presence of from 0.0001 to 5.0 mole percent based on lactone, of one or more aldehyeds and/or ketones, in which at least one halogen atom is attached as a substituent to a carbon atom located in an alpha-position relative to the appropriate carbonyl group or groups, and/or the relevant tautomeric compound or compounds, as chain transfer agent.

The term "beta-propiolactones" as used in this specification is meant to refer to beta-propiolactone (2-oxetanone) and to derivatives thereof which carry no substituents at the beta-carbon atom of the lactone ring. Preferred beta-propiolactones to be polymerized or copolymerized according to the invention are those containing a tertiary or quaternary carbon atom in the alpha-position relative to the carbonyl group. Especially preferred are the alpha, alpha-dialkyl-beta-propiolacetones wherein each of the alkyl groups independently has from one to four carbon atoms. Polymers with excellent properties have been obtained from such monomers, notably by homopolymerization. Examples of useful monomers are:

alpha-ethyl-alpha-methyl-beta-propiolactone,
alpha-methyl-alpha-isopropyl-beta-propiolactone,
alpha-ethyl-alpha-n-butyl-beta-propiolactone,
alpha-chloromethyl-alpha-methyl-beta-propiolactone,
alpha, alpha-bis(chloromethyl)-beta-propiolactone, and
alpha, alpha-dimethyl-beta-propiolactone (pivalolactone).

The latter, in particular, has given outstanding results in the homopolymerization.

The polyester which is the product of the present process is a linear polymer having recurring ester structural units mainly of the formula:

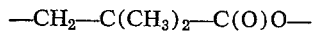

i.e., units derived from pivalolactone. Preferably the polyester is a pivalolactone homopolymer. Within the scope of the present invention, however, the copolymerization of pivalolactone with not more than 50 mole percent, preferably not more than 10 mole percent of other beta-propiolactones, such as beta-propiolactone, alpha, alpha-diethyl - beta - propiolactone and alpha-methyl-alpha-ethyl-beta-propiolactone, is most preferred.

The alpha-haloaldehydes and/or alpha-haloketones to be employed as chain-transfer agents according to the invention preferably have not more than eight carbon atoms in the molecule. Thus, the alpha-haloaldehydes may be derived, for example, from acetaldehyde by substitution of halogen atoms for one or more of the hydrogen atoms of the methyl group, or from a higher aldehyde which may be of an aliphatic, cycloaliphatic, or arylaliphatic nature, always provided that the carbon atom to which the formyl group is attached carries at least one halogen atom as substituent. Similarly, the alpha-haloketones may be derived from acetone or a higher ketone wherein halogen atoms have been substituted for one or more of the hydrogen atoms bound to at least one of the alpha-carbon atoms. Also, one of the groups attached to the carbonyl group of the ketone may be an aryl group as, for instance, in alpha-halo-acetophenones or derivatives thereof.

The halogen atom or atoms attached to an alpha-carbon atom of the particular aldehyde or ketone is usually fluorine, chlorine and/or bromine, with chlorine being particularly preferred. Other halogen atoms may be present in other positions of the molecule, if desired, for instance at a beta-carbon atom. Moreover, such compounds may contain other substituents and/or heteroatoms in the molecule, for example, carbonyl groups as in di- or polyketones or in ketocarboxylic esters. It is to be understood that many of the relevant chain-transfer agents, according to the invention, may be present, wholly or in part, in a tautomeric form, particularly as enols.

Very good results have been obtained with alpha-haloaldehydes and alpha-haloketones having from one to three chlorine atoms attached to one alpha-carbon atom. Examples of suitable chain-transfer agents are: 2,2-dichloroacetophenone, ethyl alpha-chloro-beta-oxobutyrate, alpha-bromo-cyclohexanone, and particularly trichloroacetaldehyde (chloral), 1,1,1-trichloro-2-propanone, and 3-chloro-2-butanone, the latter being especially preferred. It may also be advantageous to employ mixtures of two or more chain-transfer agents.

A total amount of from 0.0001 to 5.0 mole percent, based on the lactone, of the said chain-transfer agent of agents should be used in the polymerization or copolymerization process according to the invention. Preferred amounts range from 0.005 to 0.5%, and preferably from 0.01 to 0.3 mole percent, based on the lactone.

Anionic initiators which may be used in the process of the invention have been described, for example, in the British Pat. 1,028,928 and in the French Pat. 1,231,163. Thus, examples of suitable anionic initiators are: tertiary amines, such as trimethylamine and triethylenediamine; organic phosphorous compounds, such as triphenylphosphine, tetraphenylphosphonium bromide and triphenyl-n-butylphosphonium bromide; and betaines.

A very useful group of anionic initiators comprises "living" prepolymers of beta-propiolactones having a molecular weight between 2,000 and 20,000, especially those with a molecular weight between 4,000 and 8,000. Such prepolyers are suitably prepared by reacting an alpha, alpha-dialkyl-beta-propiolactone with a nucleophilic agent free from active hydrogen, in a molar ratio between 20:1 and 1:40, followed by separation of the prepolymer formed. Processes for the preparation of such prepolymers and their use in the polymerization of beta-propiolactones are described in the co-pending U.S. patent application Ser. No. 717,472, filed Mar. 29, 1968 and U.S. patent application Ser. No. 717,394, filed Mar. 29, 1968 by the present applicant.

Briefly, these "living" prepolymers have molecular weights between about 200 and 10,000 and are prepared by reacting a beta-lactone with a nucleophilic agent which is free of active hydrogen in a molar ratio of between 20:1 and 1:40, followed by the separation of the prepolymer.

Preferred beta-lactones have the general formula:

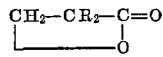

wherein R is an alkyl group containing up to 4 carbon atoms. An especially preferred beta-lactone is pivalolactone (alpha,alpha-dimethyl-beta-propiolactone).

If tertiary phosphines, stibines, arsines, amines, sulfides, or sulfoxides are used as the nucleophilic agent, a betaine-type prepolymer will result upon reaction with an alpha, alpha-dialkyl-beta-propiolactone.

A typical reaction is represented by the following equation wherein φ represents an alkyl or aryl radical such as a phenyl or butyl radical and R represents an alkyl group containing from 1 to 4 carbon atoms:

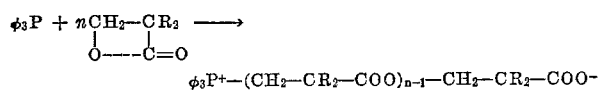

It will be appreciated that the above equation is directed to the use of tertiary phosphines but may be appropriately modified when the nucleophilic agent is a tertiary stibine, arsine, amine, etc.

If, on the other hand, an alkali metal salt of an organic or inorganic acid; an alkali metal hydroxide, -hydrosulfide, -phenolate, -thiophenolate, -alcoholate or -mercaptide; an alkali metal alkyl or aryl; a quaternary phosphonium, stibonium, arsonium, ammonium; or a tertiary sulfonium salt of an organic or inorganic acid is used as the nucleophilic agent, a prepolymer which is not a betaine may be formed, as for example:

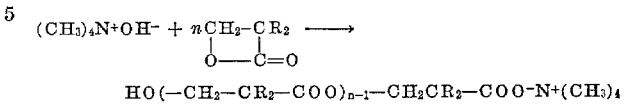

wherein R is an alkyl group containing from 1 to 4 carbon atoms.

Examples of such suitable nucleophilic agents include lithium bromide, potassium iodide, sodium acetate, sodium stearate, potassium pivalate, sodium hydroxide, lithium hydrosulfide, potassium cresolate, dibutylsulfide, dimethylsulfoxide, trimethylsulfonium iodide, trimethyl amine, tetramethylammonium laurate, tributylphosphine, triphenyl arsine, methyldiethylstibine, tetrabutylphosphonium bromide, lithium butyl, sodium naphthalene and the like. Preferred nucleophilic agents are the tertiary phosphines, stibines and arsines.

In order to obtain the prepolymer, the alpha,alpha-dialkyl-beta-propiolactone and nucleophilic agent are reacted in a molar ratio between 20:1 and 1:40, preferably between 4:1 and 1:10. Advantageously, the lactone is added to the nucleophilic agent so as to ensure that at any time during the reaction the molar ratio will not be too high.

The reaction is suitably carried out in a liquid, inert diluent, though gaseous diluents may be used, if desired, e.g., in a fluid-bed-type reactor. As used herein, the term "liquid" refers to the liquid state under the reaction conditions. Suitable diluents include, for example, hydrocarbons, ethers, esters, and halogenated hydrocarbons. It should be remembered, however, that strongly basic nucleophilic agents, such as NaOH, may not be inert towards esters and halogenated hydrocarbons. Preferred diluents are the hydrocarbons boiling below 300° C. at atmospheric pressure.

The reaction between the lactone and the nucleophilic agent is generally carried out at temperatures between 0 and 200° C., preferably between 10 and 150° C.

If liquid diluents, in particular liquid hydrocarbons, are used in the reaction, the prepolymer will usually separate therefrom after some time by precipitation in the form of a fine powder. It is usually necessary to allow the reaction mixture to stand for at least 5 to 60 minutes after the addition of the reaction components so as to have the prepolymer separated as completely as practically possible. The reaction mixture may be gently stirred during this period. Thereupon the prepolymer may be filtered, centrifuged, decanted, spray-dried or the like, and may subsequently be washed, if desired, e.g., with a volatile solvent, such as pentane. Washing is more desirable if the prepolymer is not a betaine. If in certain solvents, such as esters or halohydrocarbons, the solubility of the prepolymer is too high, precipitation may be promoted by addition of suitable ethers or liquid hydrocarbons. The reaction mixture from which the prepolymer has precipitated may be used as such, though it is preferable to separate the prepolymer from the diluent used in the reaction.

Preferred beta-propiolactone prepolymers are those derived from pivalolactone. The prepolymers are, preferably, prepared from the same alpha,alpha-dialkyl-beta-propiolactone or -lactones as are employed in the preparation of the final polymer or copolymer. Useful nucleophilic agents are, inter alia, the anionic initiators mentioned hereinbefore, particularly tertiary phosphines, such as tri-n-butylphosphine.

The "living" prepolymers mentioned above are particularly recommended as initiators in slurry polymerization processes, i.e., reactions in which at least 10% by weight of the monomeric starting material is dissolved in the liquid diluent, while not more than 1% by weight of the resulting polymeric material is soluble and, hence, precipitates causing "slurriness" of the polymerization mixture. Here, low-boiling hydrocarbons, such as hexane and heptane, or mixtures thereof, for instance those boiling within a range of from 60 to 125° C., are particularly useful as diluents.

The concentration of the initiator in the reaction mixture may vary between very wide limits, depending, inter alia, on the activity of the specific compound in question. Generally, however, it lies between 0.0001 and 1 mole percent, preferably between 0.001 and 0.5 mole percent, based on lactone.

It is usually desirable to conduct the polymerization or copolymerization in the absence of water, or at least in the presence of only minor amounts thereof, say not more than 0.05% by weight, based on lactone. If required, the beta-propiolactone or -lactones employed as monomers may be purified before use, as, for example by utilizing one of the methods described in the British Pats. 1,018,559 and 1,087,287, or a combination of such methods. Thus, the beta-propiolactones may suitably be purified, for example, by means of fractional distillation under reduced pressure, preferably after having been submitted to heating with an organic isocyanate containing a small amount of bismuth nitrate.

Although the process of the present invention may generally be carried out in the absence of any solvent or diluent, it is more often advantageous to allow the polymerizaiton to proceed in solution and/or suspension. Examlpes of suitable solvents or diluents are hydrocarbons such as hexane, heptane, isooctane, "aviation alkylate," cyclohexane and toluene; ethers such as dioxane and tetrahydrofuran; and esters such as isopropyl acetate. In certain cases it may be useful to employ as a medium for the suspension polymerization a saturated hydrocarbon having a viscosity of at least 7.5 centistokes at the polymerization temperature, such as paraffinic, medicinal or technical white oils, as described in the Briitsh Pat. 1,090,527.

The temperature to be chosen for the polymerization or copolymerization reaction usually lies between 0 and 400° C., more particularly between 20 and 350° C. Preferred temperatures range from 60 to 125° C. when a solvent or diluent is present, while for bulk polymerizations temperatures between 250 and 350° C. are recommended. It is usually advisable to conduct the process of the invention at atmospheric pressure. Higher or lower pressures are not excluded, however. Thus, superatmospheric pressures may often be necessary when the reaction is carried out at elevated temperatures.

The process of the invention may be operated batchwise or continuously, as, for example, in a tubular reactor, or in one or more reactors under steady-state conditions. It may, moreover, be favorable to add the chain-transfer agent, or part thereof, to the polymerization mixture in the course of the reaction, for example, continuously or intermittently. Thus, a solution of the chain-transfer agent in the beta-propiolactone to be polymerized may be added gradually to the mixture of a "living" pre-polymer and the diluent. It is, however, often preferred to add the beta-propiolactone to a mixture of the initiator in question and a solution of the chain-transfer agent in the appropriate solvent. Optionally, one or more of the usual additives may also be present during the polymerization or copolymerization, such as antioxidants, light stabilizers, nucleating agents, pigments and the like.

The polyesters obtained according to the process of the invention have excellent physical properties, which makes them suitable for a variety of applications, for instance in the manufacture of objects such as threads, fibers, strips, films, or products obtained by injection-molding, or for coating the latter. Their suitability for the manufacture of threads and fibers deserves particular mention.

The following examples are presented in order to illustrate the process of the invention. Unless otherwise specified, parts and percentages are given by weight.

Example I

Pivalolactone was purified by heating it together with 2% by weight of tolylene diisocyanate and 0.01% by weight of bismuth nitrate for 90 minutes at 115°C. under atmospheric pressure and subsequently isolating it by distillation.

The purified lactone was then mixed with isooctane (15 parts by volume per part by weight of lactone) and triphenylphosphine (0.4 mole percent based on lactone), and the resulting slurry heated with stirring at 95° C. for 40 hours. A virtually quantitative polymerization was thus achieved after filtration and washing with isooctane.

The polymerization was then repeated under substantially similar reaction conditions, but in the additional presence of 0.02 mole percent based on lactone of one of the chain-transfer agents listed in Table I. Comparison of the data for the intrinsic viscosity (IV), measured at 25° C. in trifluoroacetic acid, with those obtained in the absence of a chain-transfer agent, or in the presence of a ketone having no halogen atom in an alpha-position relative to the carbonyl group, clearly shows the regulating influence of the particular chain-transfer agents on the molecular weight of the polyester product.

TABLE I

| | Chain-transfer agent | IV (dl./g.) |
|---|---|---|
| Experiment Number: | | |
| 1 | None | 7.0 |
| 2 | 3-chloro-2-butanone | 5.8 |
| 3 | 2-butanone | 6.6 |
| 4 | 1,1,1-trichloroacetone | 5.5 |
| 5 | Acetone | 6.4 |
| 6 | Trichloroacetaldehyde (chloral) | 2.6 |

Experiments No. 1, 3 and 5 have been included for comparison only.

The polymer obtained as described above when using 3-chloro-2-butanone as chain-transfer agent, was then mixed with 0.05% by weight of tetramethylthiuram disulphide and 0.2% by weight of tris(nonylphenyl)phosphite as stabilizers, whereupon the intrinsic viscosity at 25° C. in trifluoroacetic acid was determined after milling at 245° C. The results are shown in Table II. The decrease in IV with time, which is very much slower than in the case of the polymer prepared in the absence of 3-chloro-2-butanone, may be considered a measure of thermal stability. It may therefore be concluded that in this respect, a considerable improvement has been achieved.

TABLE II

| Time of milling at 456° C. (minutes): | IV (dl./g.) |
|---|---|
| 0 | 5.8 (7.0) |
| 1.5 | 5.4 (5.6) |
| 2.5 | 5.1 (4.3) |

The values in brackets in Table II refer to the IV of the polymer obtained in the absence of 3-chloro-2-butanone. The latter experiments are for comparison only.

Example II

To a solution of 60.6 g. (0.3 mole) of tri-n-butylphosphine in 180 ml. of 1,2-dimethoxyethane 30 g. (0.3 mole) of pivalolactone was added at room temperature, whereupon the mixture was stirred for 3 hours. After storing overnight at −10° C., 30 g. of prepolymer was filtered off. The latter has a phosphorus content of 0.49% by weight corresponding to a molecular weight of 6,300.

(a) To a stirred, boiling mixture of 0.5 g. of the above pivalolactone prepolymer in 200 ml. of n-hexane was added over a period of 4 hours 100 g. of pivalolactone, in which 0.24 g. (0.15 mole percent) of 1,1,1-trichloroacetone had been dissolved. After additional stirring for two hours under reflux, the polymer was filtered off. It was obtained in a quantitative yield and had an intrinsic viscosity of 3.1 dl./g.

(b) When the experiment was repeated under similar conditions which only differed in that the 1,1,1-trichloroacetone had not been dissolved in the lactone monomer, but in the hexane solvent which also served as the suspension medium for the prepolymer, the intrinsic viscosity of the resulting polymer was 2.5 dl./g.

(c) When, for comparison, the polymerization was carried out in the absence of 1,1,1-trichloroacetone—under otherwise analogous conditions—a polymer having an intrinsic viscosity of 4.0 dl./g. was obtained.

I claim as my invention:

1. A process for polymerizing beta-lactones which comprises polymerizing said beta-lactones in the presence of an anionic initiator and from 0.001 to 5.0 mole percent based on the beta-lactone of at least one chain-transfer agent selected from the group consisting of alpha-haloketones and alpha-haloaldehydes.

2. A process as in claim 1 wherein the beta-lactone is an alpha,alpha-dialkyl-beta-propiolactone.

3. A process as in claim 1 wherein the beta-lactone is alpha,alpha-dimethyl-beta-propiolactone.

4. A process as in claim 1 wherein the beta-lactone is homopolymerized.

5. A process as in claim 1 wherein the beta-lactone is copolymerized with one or more other beta-lactones.

6. A process as in claim 1 wherein the alpha-haloketone or alpha-haloaldehyde has not more than 8 carbon atoms in the molecule.

7. A process as in claim 1 wherein the halogen atoms are chlorine.

8. A process as in claim 1 wherein the alpha-haloketone is 3-chloro-2-butanone.

9. A process as in claim 1 wherein the alpha-haloketone is 1,1,1-trichloro-2-propanone.

10. A process as in claim 1 wherein the alpha-haloaldehyde is chloral.

11. A process as in claim 1 wherein the anionic initiator is a prepolymer having a molecular weight between 4,000 and 8,000 and obtained by reacting an alpha,alpha-dialkyl-beta-propiolactone with a tertiary phosphine.

12. A process as in claim 11 wherein the tertiary phosphine is tri-n-butylphosphine.

References Cited

UNITED STATES PATENTS 3,471,456  10/1969  Klootwijk et al. _____ 260—78.3

WILLIAM H. SHORT, Primary Examiner

E. A. NIELSEN, Assistant Examiner